(12) United States Patent
Lin

(10) Patent No.: US 8,251,692 B2
(45) Date of Patent: Aug. 28, 2012

(54) SPRUE BUSHING FOR USE IN AN INJECTION MOLD

(75) Inventor: Hou-Yao Lin, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 52 days.

(21) Appl. No.: 12/978,316

(22) Filed: Dec. 23, 2010

(65) Prior Publication Data

US 2011/0305790 A1 Dec. 15, 2011

(30) Foreign Application Priority Data

Jun. 9, 2010 (TW) .............................. 99118633 A

(51) Int. Cl.
*B29C 45/72* (2006.01)
(52) U.S. Cl. ...................... 425/547; 264/297.2; 264/327; 264/328.8; 264/328.14; 264/328.16; 425/548; 425/552; 425/557

(58) Field of Classification Search ................. 425/547, 425/548, 552, 572; 264/297.2, 327, 328.8, 264/328.14, 328.16
See application file for complete search history.

(56) References Cited

U.S. PATENT DOCUMENTS

| | | | | |
|---|---|---|---|---|
| 5,096,410 A | * | 3/1992 | Loulourgas | 425/547 |
| 2006/0087050 A1 | * | 4/2006 | Manda | 264/40.6 |
| 2009/0212461 A1 | * | 8/2009 | Lin | 264/297.2 |
| 2011/0262578 A1 | * | 10/2011 | Lee | 425/186 |

* cited by examiner

*Primary Examiner* — Tim Heitbrink
(74) *Attorney, Agent, or Firm* — Altis Law Group, Inc.

(57) ABSTRACT

A sprue bushing includes a head, and a main body. The main body is connected to an end of the head. The main body defines at least one lateral channel. The at least one lateral channel extends through a sidewall of the main body. The sprue bushing defines a sprue and at least two longitudinal channels. The sprue extends through the head and the main body along a center axis of the sprue bushing. The at least two longitudinal channels extend through the head into the main body. One of the at least one lateral channel communicates with two of the at least two longitudinal channels.

16 Claims, 6 Drawing Sheets

US 8,251,692 B2

SPRUE BUSHING FOR USE IN AN INJECTION MOLD

BACKGROUND

1. Technical Field

The present disclosure relates to molds for the molding of thermoplastics, particularly to a sprue bushing and an injection mold using same.

2. Description of Related Art

Molds for molding of thermoplastics, particularly injection molds, comprise dies mounted on die blocks. When molding, first, molten or plasticized material is forced out from a nozzle to a sprue bushing. The sprue bushing transmits or conducts the plasticized material from the nozzle to runners which feed the plasticized material to various cavities. Then the cavities and runners are cooled to solidify the material therein by a cooling system positioned in the die block. However, the sprue bushing can not be cooled by the cooling system as it is positioned away from the cooling system. That will prolong the total cooling time of the mold.

What is needed, therefore, is a sprue bushing and an injection mold using same to overcome the above-described problem.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments.

DETAILED DESCRIPTION

Embodiments of the present disclosure will now be described in detail below, with reference to the accompanying drawings.

Figure 1:
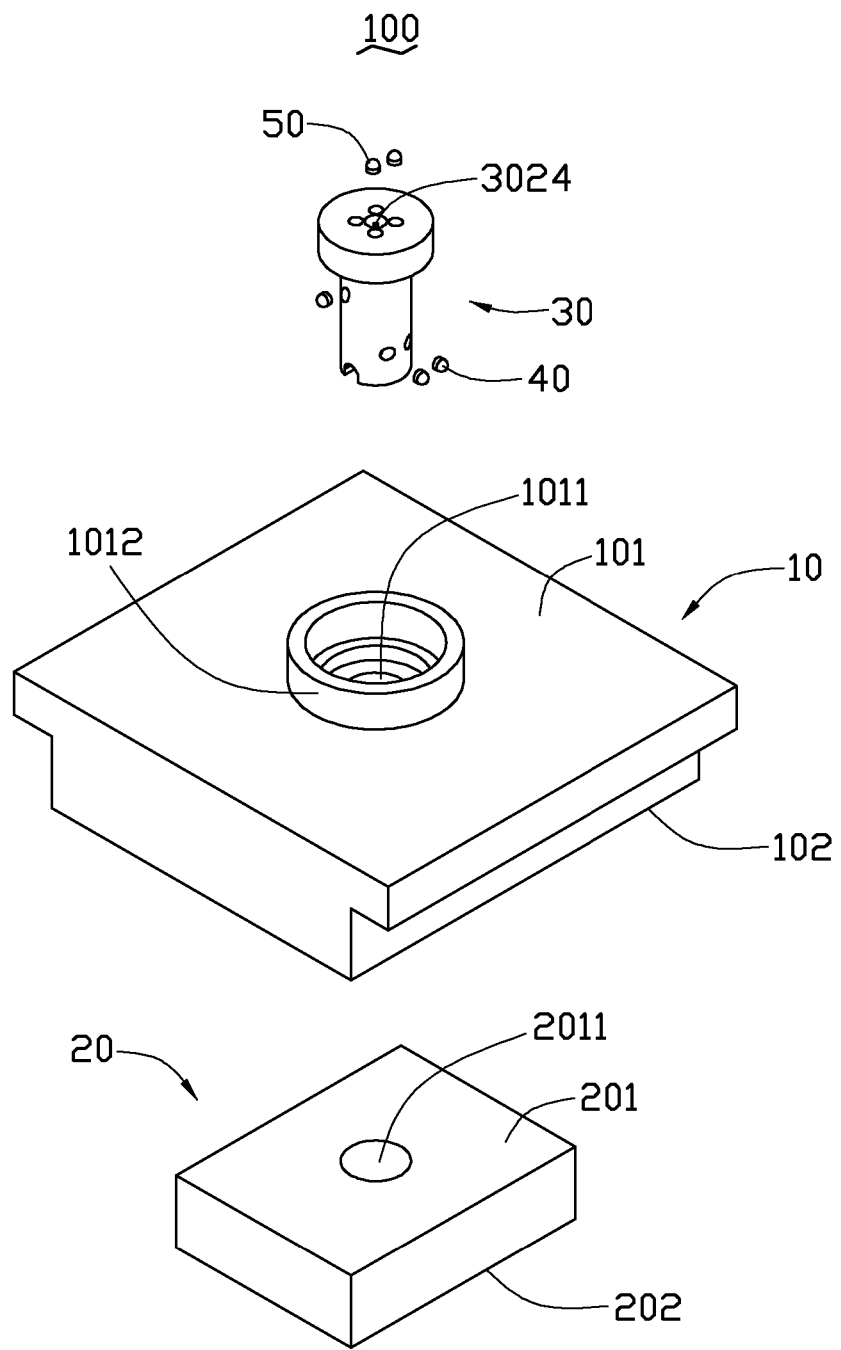
FIG. 1 is an exploded view of an injection mold according to an exemplary embodiment.
Figure 2:
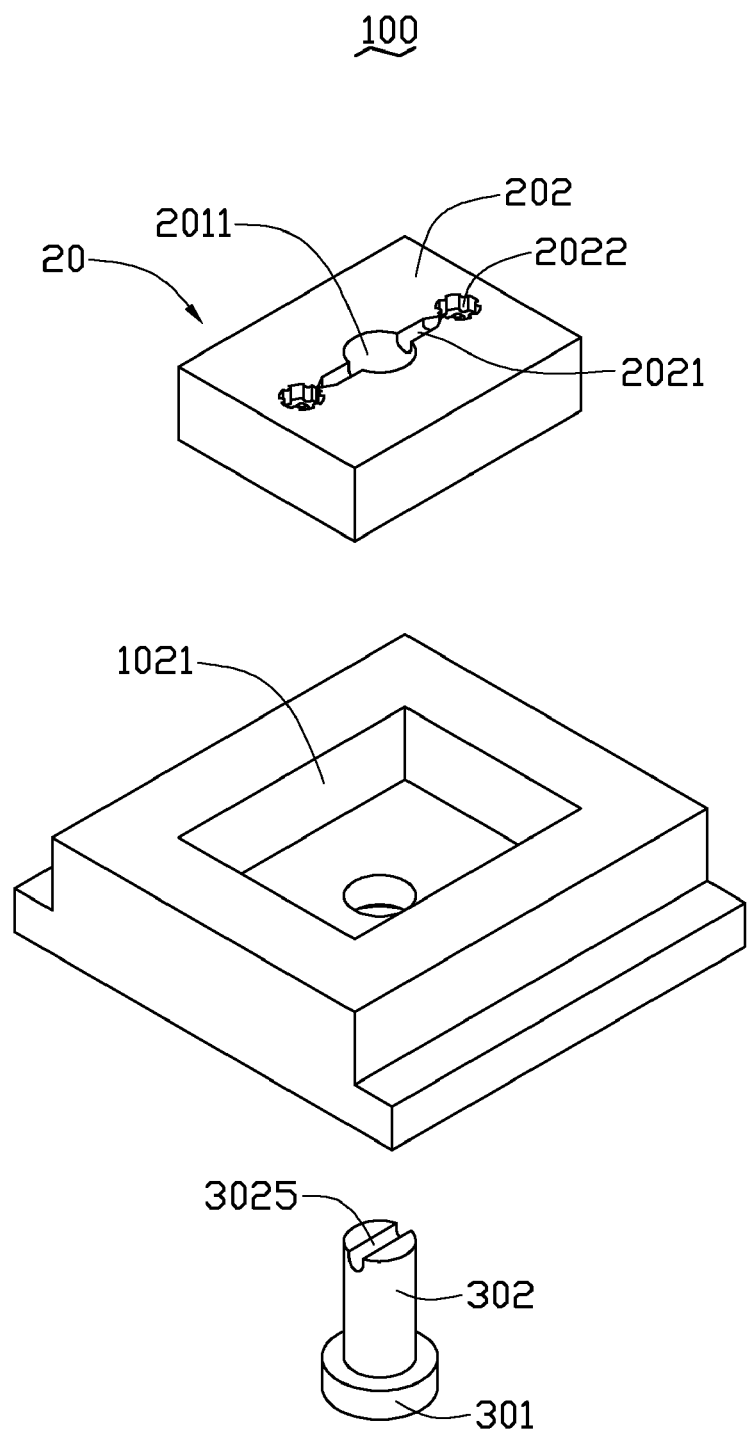
FIG. 2 is similar to FIG. 1, but showing the injection mold inverted.

Referring to FIGS. 1 and 2, an injection mold 100, according to an exemplary embodiment, is shown. In FIGS. 1 and 2, only show an upper die of the mold 100, a bottom die of the mold 100 is omitted, as it is a conventional type.

The injection mold 100 includes a fixing plate 10, a core 20 received in the fixing plate 10, and a sprue bushing 30 inserted into the fixing plate 10. The sprue bushing 30 is positioned at a side of the mold 100 away from the core 20.

The fixing plate 10 is a rectangular metal board. The fixing plate 10 includes a first surface 101 and a second surface 102 opposite to the first surface 101. A rectangular cavity 1021 is defined at the center of the second surface 102 for receiving the core 20. A receiving hole 1011 is defined at the center of the first surface 101. The receiving hole 1011 communicates with the cavity 1021, and receives the sprue bushing 30. The receiving hole 1011 is a stepped hole and includes a narrow portion adjacent to the second surface 102 and a wide portion adjacent to the first surface 101. A barrel 1012 extends outwards from the first surface 101. The barrel 1012 is coaxial to the receiving hole 1011. The inner diameter of the barrel 1012 is larger than that of the wide portion of the receiving hole 1011.

The core 20 has a rectangular configuration corresponding to the rectangular cavity 1021. The core 20 includes a contacting surface 201 and a molding surface 202 opposite to the contacting surface 201. A through hole 2011 corresponding to the receiving hole 1011 is defined at the center of the contacting surface 201, and extends to the molding surface 202. The through hole 2011 is coaxial to the receiving hole 1011. Two runners 2021 are symmetrically defined on the molding surface 202. The two runners 2021 communicate with the through hole 2011. An upper die cavity 2022 is defined at an end of each runner 2021 away from the through hole 2011.

The sprue bushing 30 is a stepped cylinder. The sprue bushing 30 includes a head 301 and a main body 302. The head 301 is larger than the main body 302 in diameter. The end surface of the main body 302 away from the head 301 defines a sub-runner 3025. In other embodiments, the sprue bushing 30 can be a conic configuration.

Figure 3:
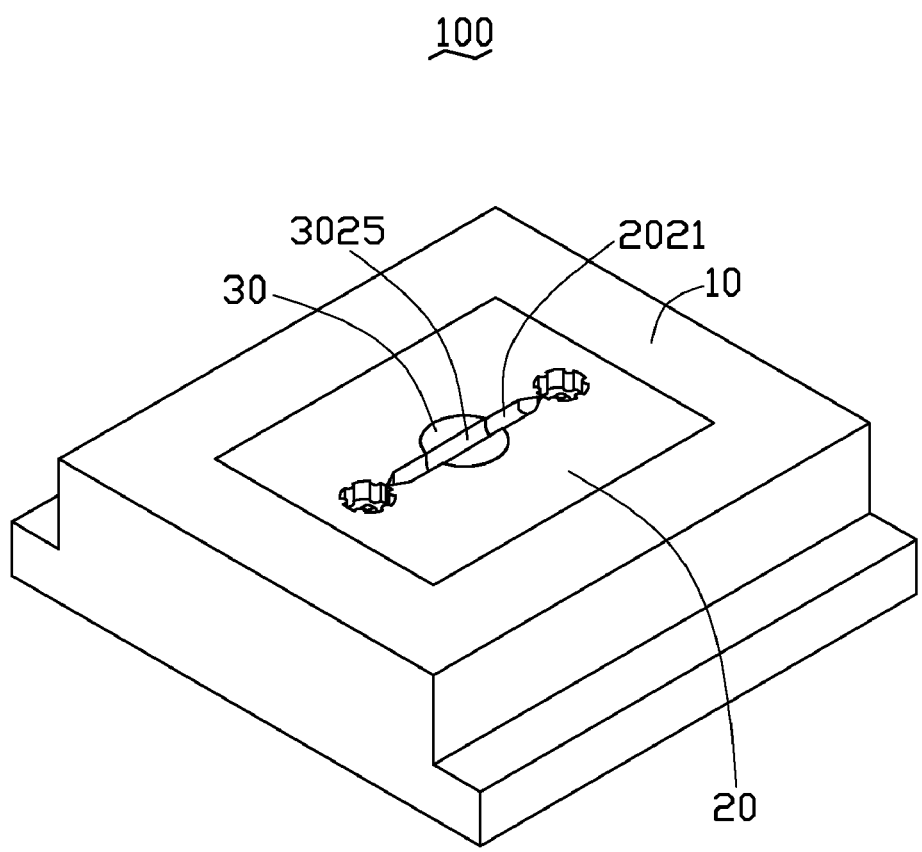
FIG. 3 is an assembled view of the injection mold of FIG. 1.

Referring to FIG. 3, the core 20 is received in the fixing plate 10. The sprue bushing 30 is inserted into the fixing plate 10 and the core 20. The sub-runner 3025 of the sprue bushing 30 is aligned with the runners 2021 of the core 20.

Figure 4:
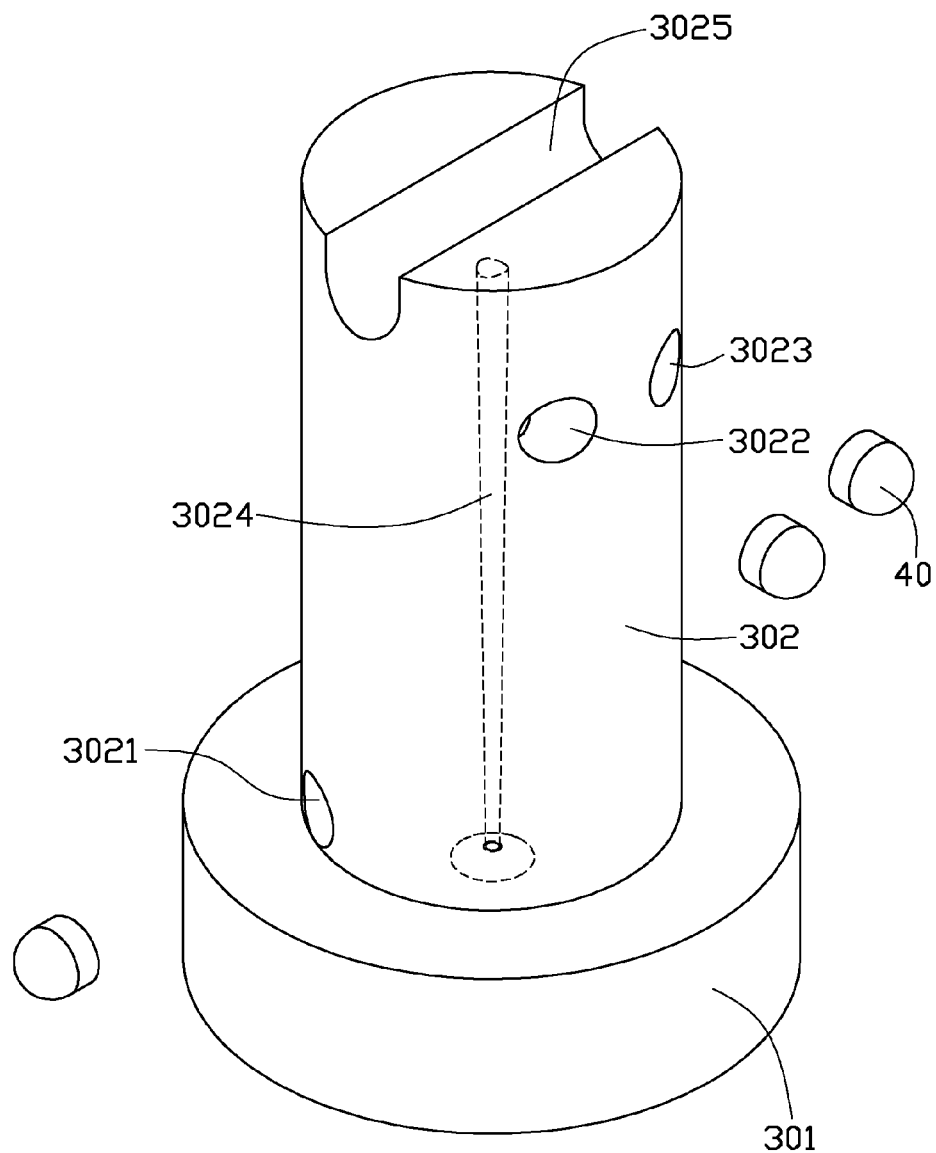
FIG. 4 is a schematic view of a sprue bushing of the injection mold of FIG. 1.
Figure 5:
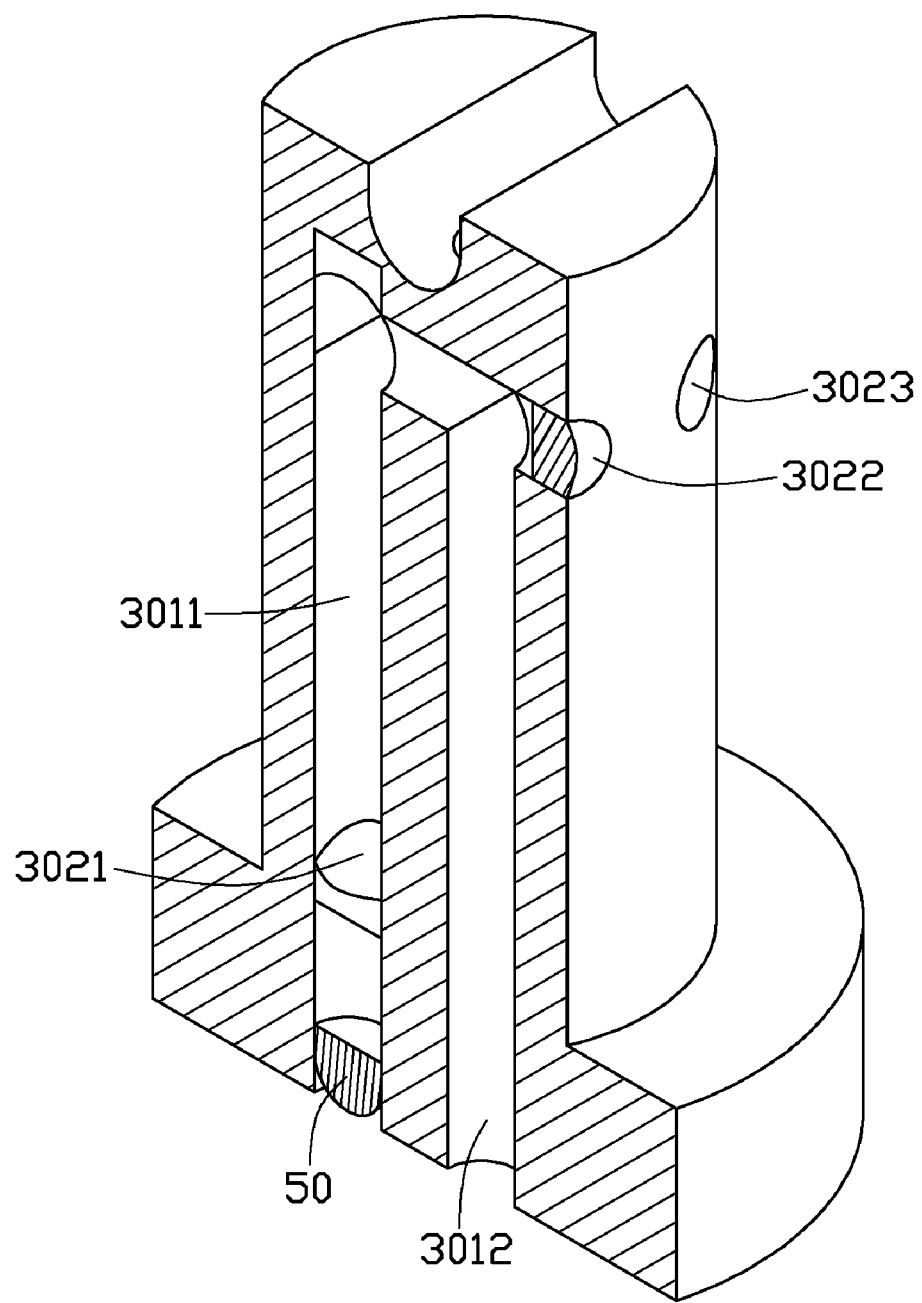
FIG. 5 is a cross-sectional view of the sprue bushing of FIG. 4.
Figure 6:
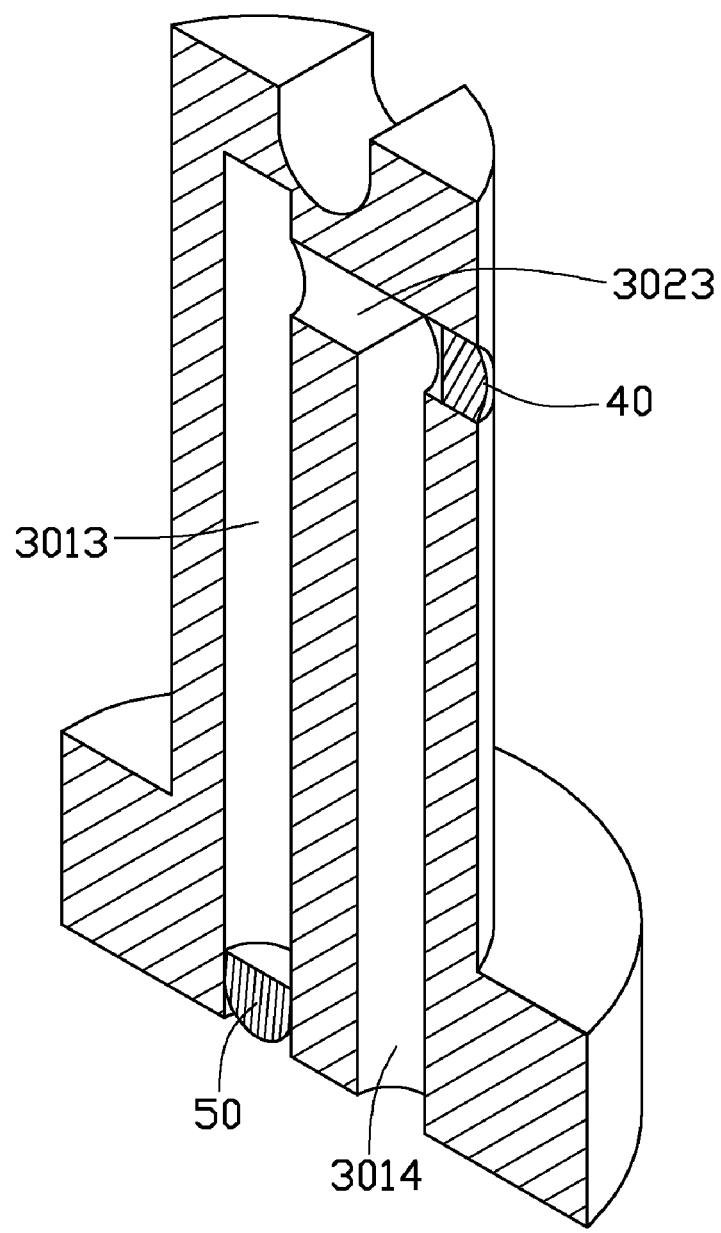
FIG. 6 is another cross-sectional view of the sprue bushing of FIG. 4.

Referring to FIGS. 4, 5 and 6, the sprue bushing 30 defines a sprue 3024 along the center axis thereof. The sprue 3024 extends through two end surfaces of the sprue bushing 30 and communicates with the sub-runner 3025. A first lateral channel 3021, a second lateral channel 3022 and a third lateral channel 3023 are defined on the sidewall of the main body 302. The lateral channels 3021, 3022 and 3023 radially extend through the sidewall of the main body 302 into the inner portion of the main body 302. The first lateral channel 3021 abuts the head 301. The second lateral channel 3022 and the third lateral channel 3023 are positioned away from the head 301. In the present embodiment, the lateral channels 3021, 3022 and 3023 are all parallel to the end surface of the main body 302. The lateral channels 3021, 3022 and 3023 are all blind holes with the same depth. The sprue bushing 30 includes three first stopples 40 corresponding to the lateral channels 3021, 3022, and 3023. The first stopples 40 stopple the lateral channels 3021, 3022, and 3023. The first stopples 40 are made of high temperature resistant material. In the present embodiment, the first stopples 40 are made of polyphenylene sulfide.

A first longitudinal channel 3011, a second longitudinal channel 3012, a third longitudinal channel 3013 and a fourth longitudinal channel 3014 extend through an end surface of the head 301 away from the main body 302 to the main body 302. The longitudinal channels 3011, 3012, 3013 and 3014 are parallel to the center axis of the sprue bushing 30, and arrayed around the sprue 3024. The longitudinal channels 3011, 3012, 3013, and 3014 are all blind holes with the same depth. Specifically, the first lateral channel 3021 communicates with the first longitudinal channel 3011 and the third longitudinal channel 3013. The second lateral channel 3022 communicates with the first longitudinal channel 3011 and the second longitudinal channel 3012. The third lateral channel 3023 communicates with the third longitudinal channel 3013 and the fourth longitudinal channel 3014. The sprue bushing 30 includes two second stopples 50 corresponding to the longitudinal channels 3011 and 3013. The second stopples 50 stopple the longitudinal channels 3011 and 3013. The second stopples 50 are made of high temperature resistant material. In the present embodiment, the second stopples 50 are made of polyphenylene sulfide.

When the injection mold 100 is fixed, the core 20 is put into the cavity 1021 of the fixing plate 10. The three first stopples 40 are respectively inserted into the lateral channels 3021, 3022, and 3023. The two second stopples 50 are respectively inserted into the first longitudinal channel 3011 and the third longitudinal channel 3013. The second longitudinal channel 3012 is sealed and connected to a water inlet tube (not shown). The fourth longitudinal channel 3014 is sealed and connected to a water outlet tube (not shown). The sprue bushing 30 is inserted into the receiving hole 1011 and the through hole 2011. The sub-runner 3025 is aligned with the runners 2021 of the core 20.

When the injection mold 100 is cooled, the water inlet tube feeds cold water into the second longitudinal channel 3012. The cold water flows through the second lateral channel 3022, the first longitudinal channel 3011, the first lateral channel 3021, the third longitudinal channel 3013, the third lateral channel 3023, the fourth longitudinal channel 3014, and discharges from the water outlet tube. The material in the sprue bushing 30 can be cooled quickly by the cold water, thus will reduce the cooling time to improve production efficiency.

While certain embodiments have been described and exemplified above, various other embodiments will be apparent to those skilled in the art from the foregoing disclosure. The present disclosure is not limited to the particular embodiments described and exemplified, and the embodiments are capable of considerable variation and modification without departure from the scope of the appended claims.

What is claimed is:

1. A sprue bushing comprising:
a head; and
a main body connected to the head and defining a first lateral channel, a second lateral channel, and a third lateral channel, the first lateral channel and the second lateral channel extending through a sidewall of the main body;
wherein the sprue bushing defines a sprue and a first longitudinal channel, a second longitudinal channel, a third longitudinal channel, and a fourth longitudinal channel, the sprue extends through the head and the main body along a center axis of the sprue bushing, the first longitudinal channel, the second longitudinal channel, the third longitudinal channel, and the fourth longitudinal channel extend through the head into the main body, the first lateral channel is communicated with the first longitudinal channel and the third longitudinal channel, the second lateral channel is communicated with the first longitudinal channel and the second longitudinal channel, the third lateral channel is communicated with the third longitudinal channel and the fourth longitudinal channel.

2. The sprue bushing as claimed in claim 1, wherein the sprue bushing comprises three first stopples and two second stopples, the three first stopples stopple the three lateral channels correspondingly, the two second stopples stopple the first longitudinal channel and the third longitudinal channel correspondingly.

3. The sprue bushing as claimed in claim 2, wherein the second longitudinal channel is configured for inputting water, the fourth longitudinal channel is configured for outputting water.

4. The sprue bushing as claimed in claim 2, wherein the first lateral channel abuts against the head, the second lateral channel and the third lateral channel are positioned away from the head.

5. The sprue bushing as claimed in claim 2, wherein the sprue is positioned at the center axis of the sprue bushing, the first longitudinal channel, the second longitudinal channel, the third longitudinal channel, the fourth longitudinal channel are parallel to the center axis of the sprue bushing, and located around the sprue.

6. The sprue bushing as claimed in claim 2, wherein the first longitudinal channel, the second longitudinal channel, the third longitudinal channel, the fourth longitudinal channel are all blind holes with the same depth; the first lateral channel, the second lateral channel, and the third lateral channel are all blind holes with the same depth.

7. The sprue bushing as claimed in claim 2, wherein the second stopples and the first stopples are made of high temperature resistant material.

8. The sprue bushing as claimed in claim 7, wherein the second stopples and the first stopples are made of polyphenylene sulfide.

9. An injection mold comprising:
a fixing plate comprising a first surface and a second surface opposite to the first surface, the fixing plate defining a receiving hole in the first surface and a cavity in the second surface, the receiving hole communicating with the cavity;
a core received in the cavity; and
a sprue bushing received in the receiving hole, the sprue bushing comprising:
a head; and
a main body connected to the head and defining at least one lateral channel, the at least one lateral channel extending through a sidewall of the main body;
wherein the sprue bushing defines a sprue, the sprue extends through the head and the main body along a center axis of the sprue bushing, the at least two longitudinal channels extend through the head into the main body, one of the at least one lateral channel communicates with two of the at least two longitudinal channels, wherein the core defines a through hole coaxial with the receiving hole, the sprue bushing passes through the receiving hole and the through hole.

10. The injection mold as claimed in claim 9, wherein the least two longitudinal channels comprises a first longitudinal channel, a second longitudinal channel, a third longitudinal channel and a fourth longitudinal channel, the at least one lateral channel comprises a first lateral channel, a second lateral channel and a third lateral channel, the first lateral channel is communicated with the first longitudinal channel and the third longitudinal channel, the second lateral channel is communicated with the first longitudinal channel and the second longitudinal channel, the third lateral channel is communicated with the third longitudinal channel and the fourth longitudinal channel; the sprue bushing comprises three first stopples and two second stopples, the first stopples stopple the three lateral channels correspondingly, the two second stopples stopple the first longitudinal channel and the third longitudinal channel correspondingly.

11. The injection mold as claimed in claim 10, wherein the second longitudinal channel is configured for inputting water, the fourth longitudinal channel is configured for outputting water.

12. The injection mold as claimed in claim 10, wherein the first lateral channel abuts against the head, the second lateral channel and the third lateral channel are positioned away from the head.

13. The injection mold as claimed in claim 10, wherein the sprue is positioned at the center axis of the sprue bushing, the first longitudinal channel, the second longitudinal channel, the third longitudinal channel, the fourth longitudinal channel are parallel to the center axis of the sprue bushing, and located around the sprue.

14. The injection mold as claimed in claim 10, wherein the first longitudinal channel, the second longitudinal channel, the third longitudinal channel, the fourth longitudinal channel are all blind holes with the same depth, the first lateral channel, the second lateral channel, and the third lateral channel are all blind holes with the same depth.

15. The injection mold as claimed in claim 10, wherein the second stopples and the first stopples are made of high temperature resistant material.

16. The injection mold as claimed in claim 15, wherein the second stopples and the first stopples are made of polyphenylene sulfide.

\* \* \* \* \*